Patented Apr. 12, 1927.

1,624,164

UNITED STATES PATENT OFFICE.

HARRY E. DUBIN, OF NEW YORK, N. Y., ASSIGNOR, BY MESNE ASSIGNMENTS, TO H. A. METZ LABORATORIES, INC., OF NEW YORK, N. Y., A CORPORATION OF NEW YORK.

EDIBLE-FAT COMPOSITION.

No Drawing.     Application filed February 19, 1925. Serial No. 10,407.

United States Patent No. 1,455,254 in the name of Max Kahn discloses the use of odd-carbon fats, that is, glycerides of fatty acids having an odd number of carbon atoms, such as for instance the glyceride of margaric acid, for the treatment of acidosis. The melting point of glyceryl margarate is about 60° C., whereas edible fats should have a melting point of about 37° C., body temperature, or lower, and it has therefore been proposed, see Journal of the American Medical Association, 83, 1685, Nov. 22, 1924, to combine glyceryl margarate with liquid petrolatum and water, for example 82 parts of glyceryl margarate, 12 parts of liquid petrolatum and 6 parts of water, to secure a product having a melting point of about 37° C. This composition is objectionable in that it contains 18% of therapeutically inactive or valueless material and also on account of its unpalatable taste.

An object of the present invention is to produce an odd-carbon fat composition which is practically free of objectionable odor and taste, has a melting point sufficiently low to render it easily assimilated, and is free of therapeutically inactive materials.

I have found that mixtures of glyceryl margarate and ethyl margarate in suitable proportions meet these requirements. Ethyl margarate is a liquid at room temperature practically without odor or taste. Glyceryl margarate as stated above has a melting point of about 60° C. and an objectionable tallowy taste. Mixtures of ethyl margarate and glyceryl margarate containing 50% or more of ethyl margarate have melting points of 37° C. or less, are substantially odorless and tasteless and quite palatable. As the proportion of ethyl margarate in the mixture is increased the melting point is lowered and the assimilability by the body is improved. Mixtures containing 75% and more of ethyl margarate even to the practical exclusion of the glyceryl margarate are suitable with respect to odor, taste, palatability and consistency for use as, or in, foods.

In the foregoing description reference is made to compositions containing equal proportions of the ethyl margarate and glyceryl margarate, this being about the upper limit of glyceryl margarate content in compositions designed for use directly and alone as foods. It is to be understood, however, that the invention is not limited to compositions containing 50% or more of ethyl margarate. Smaller proportions of ethyl margarate produce to an unexpected and unforeseeable extent corresponding to the proportion thereof used, the effects above referred to, that is, reduction of the melting point, elimination of objectionable odor and taste and improvement in the palatability and assimilability of the product. The invention is moreover not limited to compositions of ethyl margarate and glyceryl margarate. The invention embraces generally compositions comprising a plurality of compounds or products comprising or containing one or more odd-carbon fatty acids and having the characteristics described, that is, freedom from objectionable odor and taste, melting point sufficiently low to render them suitable for use as food and readily assimilated, and freedom from therapeutically inactive material. Among the combinations falling within the scope of my invention are mixtures of ethyl margarate with odd-carbon fats other than glyceryl margarate, mixtures of alkyl margarates other than ethyl margarate with glyceryl margarate, mixtures of alkyl margarates other than ethyl margarate with odd-carbon fats other than glyceryl margarate, mixtures of ethyl and other alkyl esters of odd-carbon fatty acids other than margaric acid with glyceryl margarate and other odd-carbon fats, and mixtures of two or more odd-carbon fats or two or more esters of odd-carbon fatty acids. It is also within the scope of my invention to add to the edible fat compositions of my invention coloring and flavoring materials and the like in the well known manner.

I claim:—

1. An edible composition comprising a plurality of products each comprising or containing an odd-carbon fatty acid, said composition having a melting point not higher than 37° C. and being substantially free from therapeutically inactive material, objectionable odor and objectionable taste.

2. An edible composition comprising an alkyl ester of a fatty acid having an odd number of carbon atoms and a glyceride of a fatty acid having an odd number of carbon atoms and being substantially free from objectionable odor and objectionable taste.

3. An edible composition comprising an alkyl ester of a fatty acid having an odd number of carbon atoms and glyceryl margarate and being substantially free from objectionable odor and objectionable taste.

4. An edible composition comprising an ethyl ester of a fatty acid having an odd number of carbon atoms and a glyceride of a fatty acid having an odd number of carbon atoms and being substantially free from objectionable odor and objectionable taste.

5. An edible composition comprising an ethyl ester of a fatty acid having an odd number of carbon atoms and glyceryl margarate and being substantially free from objectionable odor and objectionable taste.

6. An edible composition comprising an alkyl ester of margaric acid and a glyceride of a fatty acid having an odd number of carbon atoms and being substantially free from objectionable odor and objectionable taste.

7. An edible composition comprising an alkyl margarate and glyceryl margarate and being substantially free from objectionable odor and objectionable taste.

8. An edible composition comprising ethyl margarate and a glyceride of a fatty acid having an odd number of carbon atoms and being substantially free from objectionable odor and objectionable taste.

9. An edible composition comprising ethyl margarate and glyceryl margarate and being substantially free from objectionable odor and objectionable taste.

10. A composition as set forth in claim 2 in which the alkyl ester comprises at least fifty percent of the composition.

11. A composition as set forth in claim 6 in which the alkyl ester comprises at least fifty percent of the composition.

12. A composition as set forth in claim 9 in which the ethyl margarate comprises at least fifty percent of the composition.

In testimony whereof, I affix my signature.

HARRY E. DUBIN.